(12) United States Patent
Gonzales

(10) Patent No.: US 11,878,223 B2
(45) Date of Patent: Jan. 23, 2024

(54) ILLUMINATED RIM FOR ROUNDNET

(71) Applicant: Nicholas Gonzales, Chicago, IL (US)

(72) Inventor: Nicholas Gonzales, Chicago, IL (US)

(73) Assignee: KANKAKEE SPIKEBALL, INC., Chicago, IL (US)

( * ) Notice: Subject to any disclaimer, the term of this patent is extended or adjusted under 35 U.S.C. 154(b) by 305 days.

(21) Appl. No.: 17/218,138

(22) Filed: Mar. 30, 2021

(65) Prior Publication Data

US 2021/0354014 A1 Nov. 18, 2021

Related U.S. Application Data

(60) Provisional application No. 63/025,111, filed on May 14, 2020.

(51) Int. Cl.

| A63B 63/00 | (2006.01) |
|---|---|
| A63B 67/00 | (2006.01) |
| H05B 45/20 | (2020.01) |
| H05B 45/10 | (2020.01) |
| F21V 23/00 | (2015.01) |
| F21V 23/04 | (2006.01) |
| F21Y 115/10 | (2016.01) |

(52) U.S. Cl.
CPC .......... *A63B 63/007* (2013.01); *A63B 67/002* (2013.01); *F21V 23/002* (2013.01); *F21V 23/0485* (2013.01); *H05B 45/10* (2020.01); *H05B 45/20* (2020.01); *A63B 2220/56* (2013.01); *A63B 2220/833* (2013.01); *A63B 2225/74* (2020.08); *F21Y 2115/10* (2016.08)

(58) Field of Classification Search
CPC ..... A63B 63/00; A63B 63/007; A63B 67/002; A63B 2220/56; A63B 2220/833; A63B 2225/74; F21V 23/002; F21V 23/0485; H05B 45/10; H05B 45/20; F21Y 2115/10
See application file for complete search history.

(56) References Cited

U.S. PATENT DOCUMENTS

| 4,915,666 | A  | * | 4/1990  | Maleyko  | A63B 19/00 |
|---|---|---|---|---|---|
|           |    |   |         |          | 446/490    |
| 6,569,028 | B1 | * | 5/2003  | Nichols  | A63B 69/3694 |
|           |    |   |         |          | 473/153    |
| 8,807,568 | B1 | * | 8/2014  | Ruder    | A63B 67/002 |
|           |    |   |         |          | 273/342    |
| 9,370,727 | B2 | * | 6/2016  | Deluz    | A63B 19/00 |
| D894,298  | S  | * | 8/2020  | Gonzales | G02B 6/0006 |
|           |    |   |         |          | D21/698    |
| 2005/0255787 | A1 | * | 11/2005 | Pak | A63B 19/00 |
|           |    |   |         |          | 446/236    |

(Continued)

*Primary Examiner* — Raleigh W Chiu
(74) *Attorney, Agent, or Firm* — Justin Lampel

(57) ABSTRACT

An illuminated rim for a roundnet set is provided. The illuminated rim of the present application is an illuminated circular frame attached to the top of an existing frame of a standard roundnet set. The underside of a connector unit of the illuminated rim snaps onto the existing frame of the standard roundnet set. An optional sensor may be used in connection with the game to detect pressure on the net from, for example, a ball hitting it. Once the sensor is triggered, the LED lights may be programmed to go off. In an embodiment, the device may be programmed so that the light may be used to determine if a valid or invalid shot was executed by a player.

17 Claims, 5 Drawing Sheets

(56) References Cited

U.S. PATENT DOCUMENTS

| | | | |
|---|---|---|---|
| 2015/0109767 A1* | 4/2015 | Fang | G02B 6/0006 362/158 |
| 2015/0328515 A1* | 11/2015 | Prendergast | A63B 43/00 273/400 |
| 2017/0239542 A1* | 8/2017 | Seto | A63B 63/083 |
| 2020/0070024 A1* | 3/2020 | Xiong | A63B 5/11 |
| 2021/0354014 A1* | 11/2021 | Gonzales | F21V 23/0485 |

* cited by examiner

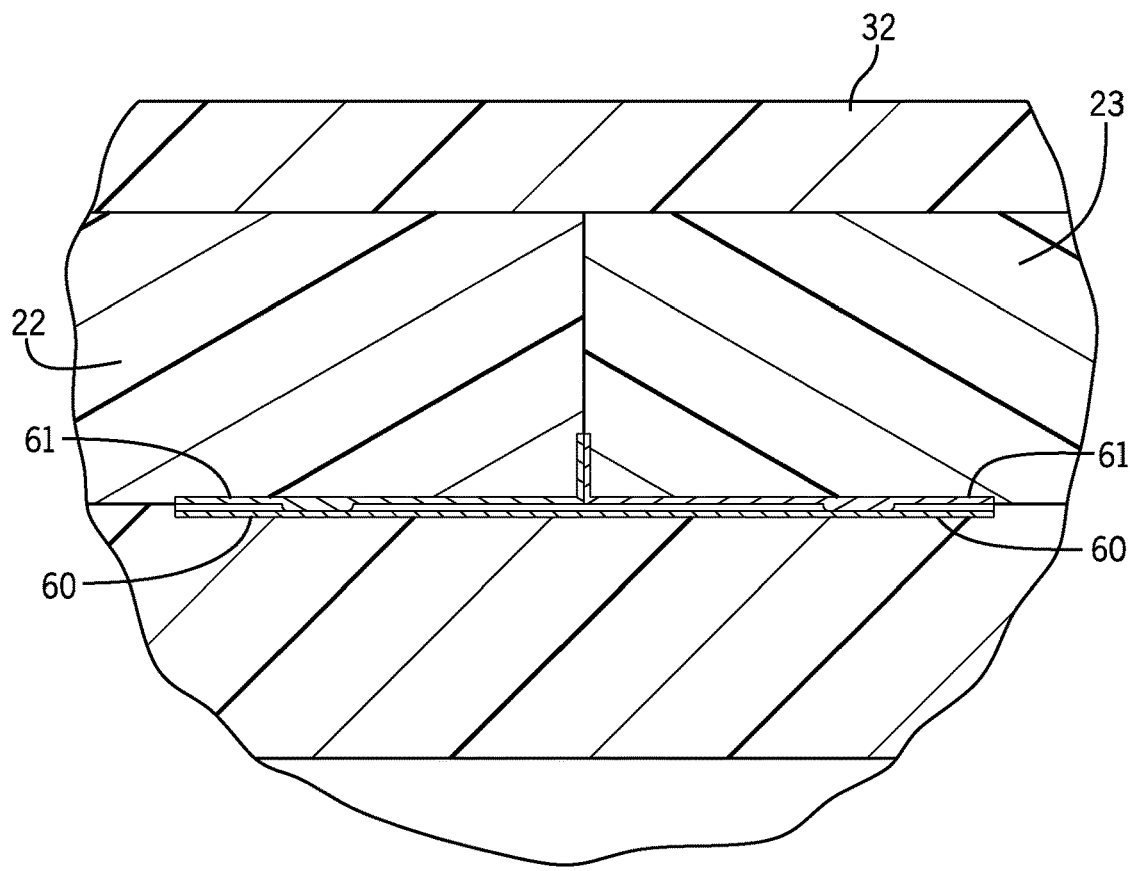
FIG. 8
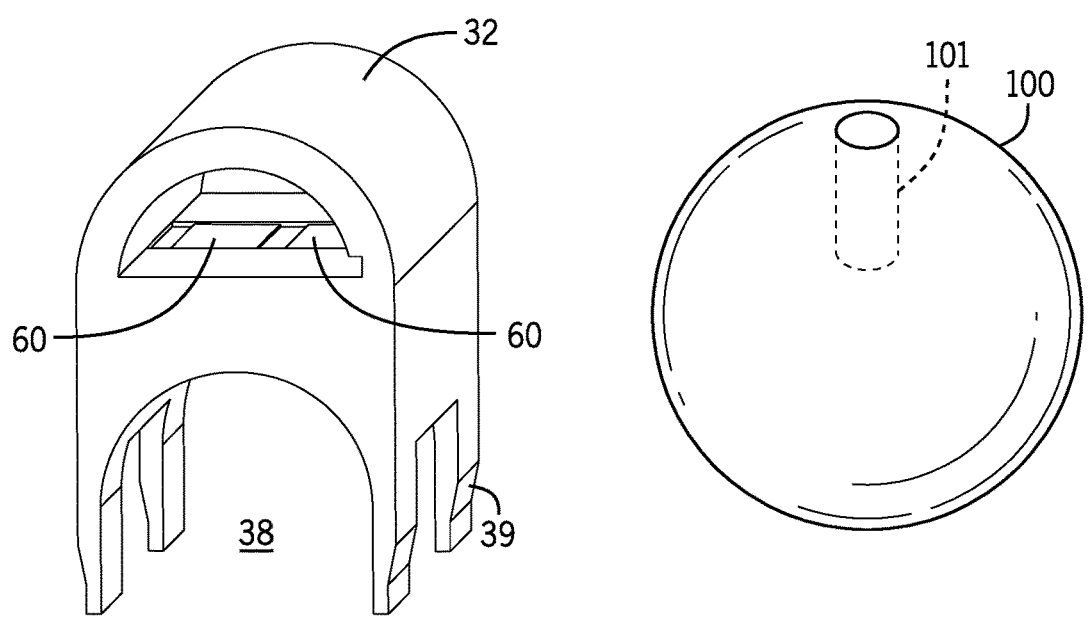
FIG. 9
FIG. 10

ILLUMINATED RIM FOR ROUNDNET

REFERENCE TO RELATED APPLICATIONS

This application claims priority to U.S. Provisional Application No. 63/025,111, which was filed on May 14, 2020 and the entire contents of are incorporated by reference herein.

BACKGROUND OF THE INVENTION

An illuminated rim for a roundnet set is provided. The illuminated rim of the present application is an illuminated circular frame attached to the top of an existing frame of a standard roundnet set. The underside of a connector unit of the illuminated rim snaps onto the existing frame of the standard roundnet set. An optional sensor may be used in connection with the game to detect pressure on the net from, for example, a ball hitting it. Once the sensor is triggered, the LED lights may be programmed to go off. In an embodiment, the device may be programmed so that the light may be used to determine if a valid or invalid shot was executed by a player.

Patents related to ball games have been granted in the past. For example, U.S. Pat. No. 8,807,568 to Ruder discloses a game having a generally flat surface which allows balls to bounce. The generally flat surface largely resembles a trampoline. In use, the generally flat surface is substantially parallel with respect to the ground. A user stands on solid ground outside a perimeter of the generally flat surface and bounces the ball off the generally flat surface. The height and tension of the generally flat surface may be easily adjusted.

Further, U.S. Pat. No. 8,002,282 to Koski discloses a ball game with skipping implement and targets comprised of a skipping implement having a highly efficient rebounding and skipping surface where by a player can throw a ball onto the skipping implement redirecting the ball in a multitude of directions including targeting a basket for recreation and game play.

Further, U.S. Pat. No. 5,201,526 to Ketcham, Jr. discloses an outdoor lawn-type game for two or more players in which discs are flipped from the ground onto a trampoline device comprised of a resiliently-tensioned net held in a horizontal position by a frame with legs. The discs are flipped using elongated flipping sticks with two bent fork tines at one end. The objective of the game, in getting a specified number of a players' or teams' discs to rest on the net, is rendered difficult by the resilient nature of the net and various options allowed by the rules of the game to dislodge an opponent's disc from the net or send an opponents disc to a point distant from the net. Various competitive strategies and skills are required by the individuals and/or the teams playing the game. No special ground surface is required. The game may be played on grass, in the woods or on the beach.

However, these patents fail to disclose an illuminated rim for a roundnet set. Further, these patents fail to provide an illuminated rim for a roundnet set that has multiple light settings.

SUMMARY OF THE INVENTION

An illuminated rim for a roundnet set is provided. The illuminated rim of the present application is an illuminated circular frame attached to the top of an existing frame of a standard roundnet set. The underside of a connector unit of the illuminated rim snaps onto the existing frame of the standard roundnet set. An optional sensor may be used in connection with the game to detect pressure on the net from, for example, a ball hitting it. Once the sensor is triggered, the LED lights may be programmed to go off. In an embodiment, the device may be programmed so that the light may be used to determine if a valid or invalid shot was executed by a player.

An advantage of the present illuminated rim for a roundnet set is that it is lightweight and portable.

And another advantage of the present illuminated rim for a roundnet set is that it may allow a game of roundnet be played in low lighting.

Yet another advantage of the present illuminated rim for a roundnet set is that it may be attached over an existing roundnet set.

Still another advantage of the present illuminated rim for a roundnet set is that, in an embodiment, it may have changing lights.

In yet another advantage of the present illuminated rim for a roundnet set is that, in an embodiment, it may have a sensor for triggering a light when the net surface of the roundnet set is hit by a ball.

For a more complete understanding of the above listed features and advantages of the present illuminated rim for a roundnet set, reference should be made to the following detailed description of the preferred embodiments. Further, additional features and advantages of the invention are described in, and will be apparent from, the detailed description of the preferred embodiments.

BRIEF DESCRIPTION OF THE DRAWINGS

FIG. 8 illustrates a close-up view of elements of FIG. 7.

FIG. 9 illustrates a perspective view of the interior of the connector unit of the illuminated rim.

FIG. 10 illustrates a view of a ball used in connection with the illuminated rim for a roundnet set.

DETAILED DESCRIPTION OF THE PREFERRED EMBODIMENTS

An illuminated rim for a roundnet set is provided. The illuminated rim of the present application is an illuminated circular frame attached to the top of an existing frame of a standard roundnet set. The underside of a connector unit of the illuminated rim snaps onto the existing frame of the standard roundnet set. An optional sensor may be used in connection with the game to detect pressure on the net from, for example, a ball hitting it. Once the sensor is triggered, the LED lights may be programmed to go off. In an embodiment, the device may be programmed so that the light may be used to determine if a valid or invalid shot was executed by a player.

Figure 1:
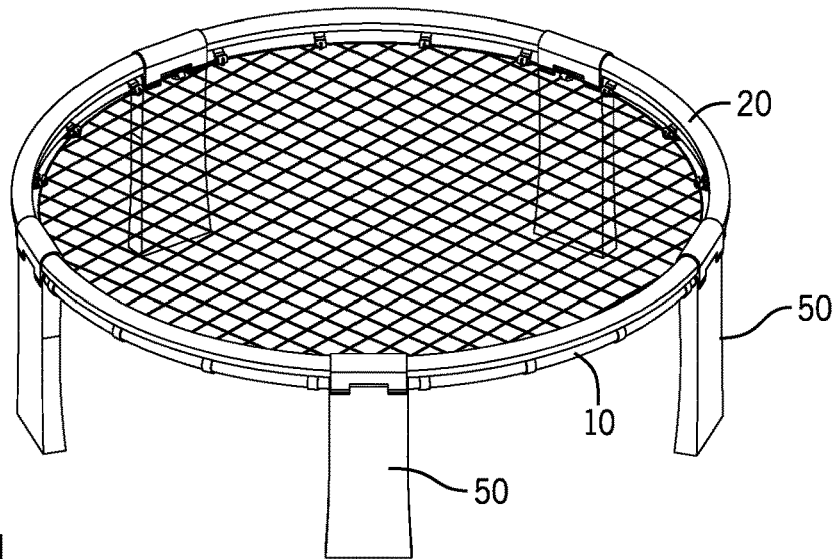
FIG. 1 illustrates a perspective view of the illuminated rim for a roundnet set in the fully formed functional orientation wherein the illuminated rim is secured to an existing roundnet set.
Figure 2:
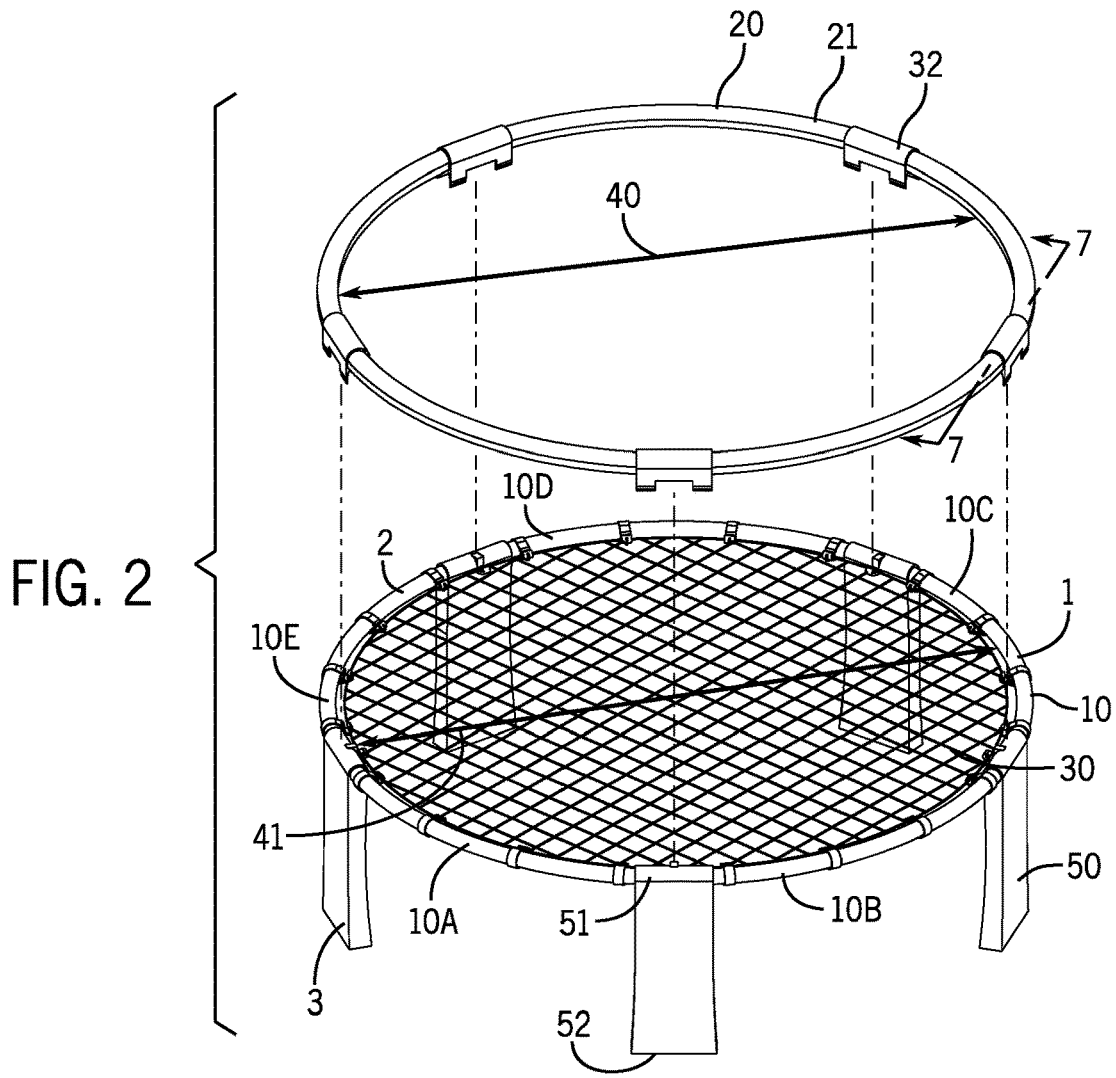
FIG. 2 illustrates an exploded perspective view of the illuminated rim for a roundnet set wherein the illuminated rim is removed from the roundnet set for illustrative purposes.

Referring now to the drawings, FIGS. 1 and 2 illustrate a roundnet set 1 and the present illuminated rim. FIG. 1 illustrates the present illuminated rim already secured to the standard roundnet set and FIG. 2 illustrates the illuminated rim in the process of either being inserted or removed from the standard roundnet set.

The standard roundnet set 1 may have a frame 10, a flexible bouncing (elastic) surface 30 such as a net, a plurality of legs 50 and a ball. The ball 100 of the present illuminated set (FIG. 10) may have an interior light 101 in one embodiment. The bouncing surface 30 is preferably a netting secured to the frame 10 and acts similar to a trampoline for bouncing a ball off of. In an embodiment, the legs 50 and/or frame 10 are lightweight yet durable, so as to reduce the overall weight of the set 1. The set 1 may have a top 2 and a bottom 3 (defined by the bottom of the legs). Preferably, the frame 10 is generally circular, although the frame 10 may be of any suitable size and shape.

The frame 10 of the roundnet set 1 may be made of a plurality of units 10A, 10B, 10C, 10D and 10E as shown in FIG. 2. It should be understood that the exact number of units 10A, 10B, 10C, 10D and 10E may vary and, therefore, the number of units is not intended to be limited to exactly five frame member units but may have a greater or fewer number of frame member units. Further, in one embodiment, the individual units 10A-10E are secured together at the legs 50 by openings (not visible) located at the top and sides of the legs 50.

In an embodiment, the legs 50 of the standard set 1 may have a first end 51 (or top) and a second end 52 (or bottom). Preferably, all the plurality of legs 50 are identical (or at least substantially similar).

In an embodiment of the present application, an illuminated frame 20 may be used in connection with the standard roundnet set 1. The illuminated frame 20 may be made of a plurality of single individual frame units 21 and a plurality of connector units 32 that together form a circle. When assembled into the circle, the illuminated frame 20 has a diameter 40 which is substantially similar or identical to a diameter 41 of the assembled standard roundnet frame 10 so that the illuminated rim 20 may be secured to the roundnet frame 10.

Figure 3:
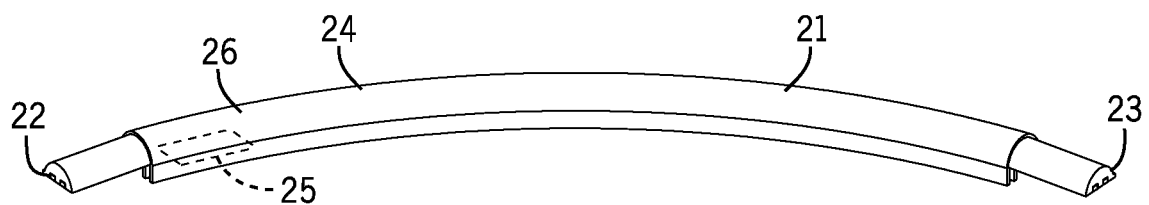
FIG. 3 illustrates a side view of a single individual frame member unit of the present illuminated rim for a roundnet set.
Figure 4:
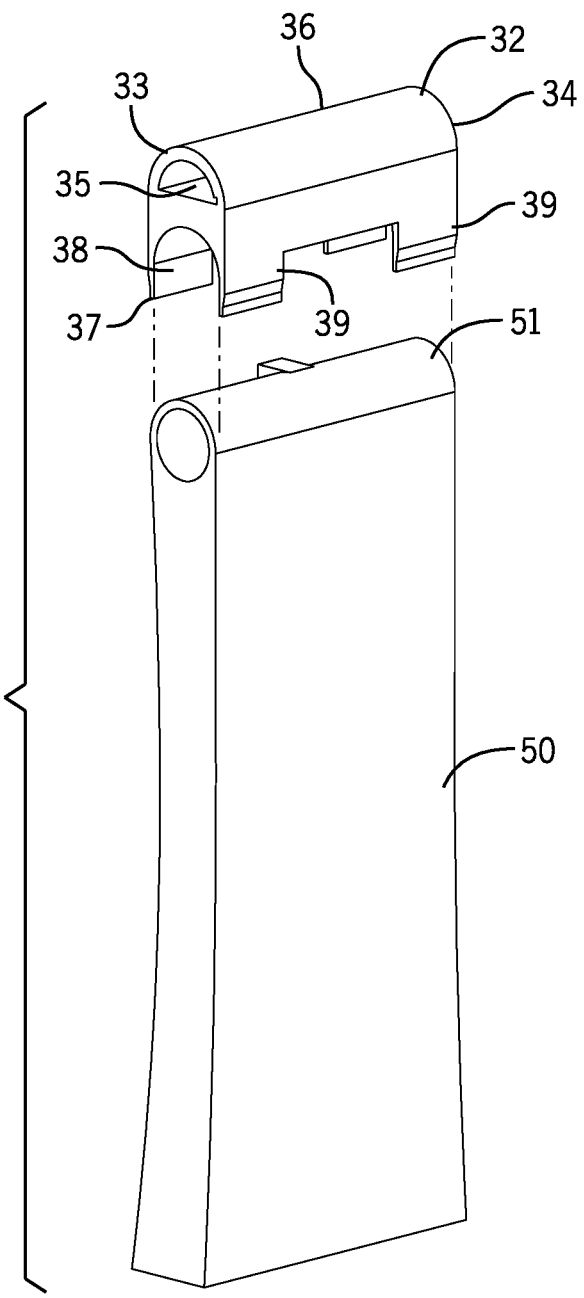
FIG. 4 illustrates an exploded view of a connector unit of the illuminated rim for a roundnet set wherein the connector unit is in the process of being inserted onto or removed from the leg of the standard roundnet set.

Referring now to FIG. 3, each single individual frame unit 21 of the illuminated rim 20 may have a first end 22, a second end 23, a top 26 and a central unit 24 wherein the first end 22 and the second end 23 are smaller than the central unit 24 in width, height and length. Each of the single frame units 21 are arched-shaped so that the illuminated rim 20 is circular when fully formed as shown in FIG. 2; although, in an alternative embodiment various additional shapes may be used, including straight single frame units.

The interior of the single frame unit 21 may have a single light or a plurality of lights 25. FIG. 3 illustrates only one small light for illustrative purposes, but in the preferred embodiment, substantially the entire interior of the central unit 24 has an elongated light or a plurality of lights. The exterior surface of the single frame unit 21 may be transparent or at least may otherwise allow light generated from the light 25 within the interior of the central unit 24 to pass through the exterior covering so as to be visible when the light 25 is turned on. In an embodiment, the light 25 may be an LED light. In an embodiment of use, instead of merely being on or off with one set color, the light(s) 25 of the single frame units 21 may alternate colors and/or timing between off and on so as to create a party-type atmosphere. In an embodiment, the device 1 may be programmed so that the light 25 may be used to determine if a valid or invalid shot was executed by a player. Specifically, in one embodiment, the light(s) 25 may illuminate green if the ball properly hits the net while the light(s) 25 may illuminate red if the ball improperly strikes the rim. In an embodiment, a sensor may trigger the light 25 to go off when a ball 100 properly strikes the net 30 of the roundnet set.

In an embodiment, the connector units 32 may have a first end 33, a second end 34 and an interior channel 35 extending from the first end 33 to the second end 34 of the connector unit 32. The connector unit 32 may further have a top 36 and a bottom 37. Preferably, the top 36 is rounded. The bottom 37 of the connector unit 32 may have an opening channel 38 formed by a plurality of extensions 39, which together form a securing mechanism. The figures illustrate four extensions 39, however, a greater or fewer number of extensions 39 of the bottom 37 of the connector unit 32 may be used. The extensions 39 may be angled inward so as to snap onto the top 51 of the top of the leg units 50 of the existing roundnet frame so as to remain secured there via friction until pulled off by a user during disassembly of the set. As a result, a user may snap the connector unit 32 onto the top 51 of the leg 50 or may remove the connector unit 32 from the top 51 of the leg 50 of the standard roundnet set.

Figure 5:
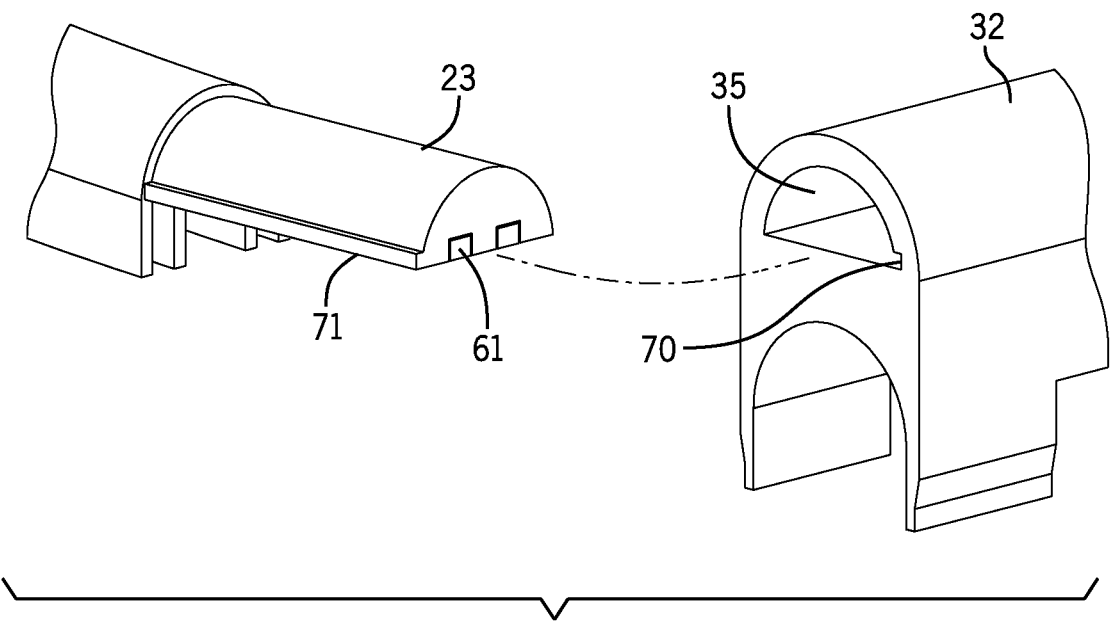
FIG. 5 illustrates a view of the connector unit of the present illuminated rim for a roundnet set being inserted into a single individual frame member of the connector unit.

Within the interior channel 35 of the connector unit 32 may be at least one electrically conductive strip 60 (as best illustrated in FIG. 9). The electrically conductive strip 60 may allow an electrical current to be transferred around the rim 20 via the individual units. Located on both the first end 22 and second end 23 of each of the single individual frame units 21 may be corresponding electrically conductive strip 61 (FIG. 5). When the first end 22 of one frame unit 21 is inserted into the channel 35 of the connector unit 32, and when the second end 23 of a second frame unit 21 is inserted into the opposing end of the same connector unit 32, an electrical current may pass through from the first frame unit 21 to a second frame unit 21 by the electrically conductive strip 60 of the connector unit 32 and the two electrically conductive strips 61 of the individual frame units 21. As a result, an electrical current may pass completely through the assembled rim 20 and the assembled rim 20 may become illuminated. In one embodiment, the connector units 32 are generally identical, except that one of the connector units 32 may have an internal battery and/or charger port (not shown) so that the illuminated rim 20 may be powered. The connector unit 32 having the internal battery may store power when plugged into a wall outlet, USB or the like or may use power from internal batteries. An on/off power/mode switch may also be located on that connector unit 32

In an embodiment, one side of the interior channel 35 of the connector unit 32 may have an extended opening 70 (FIG. 5). The extended opening 70 of the interior channel 35 of the connector unit 32 may receive an extended rim 71 (FIG. 5) of the first end 22 or second end 23 of the individual frame units 21 so that a user must properly align the pieces of the illuminated frame 20 in the proper manner to form a complete circle.

Figure 6:
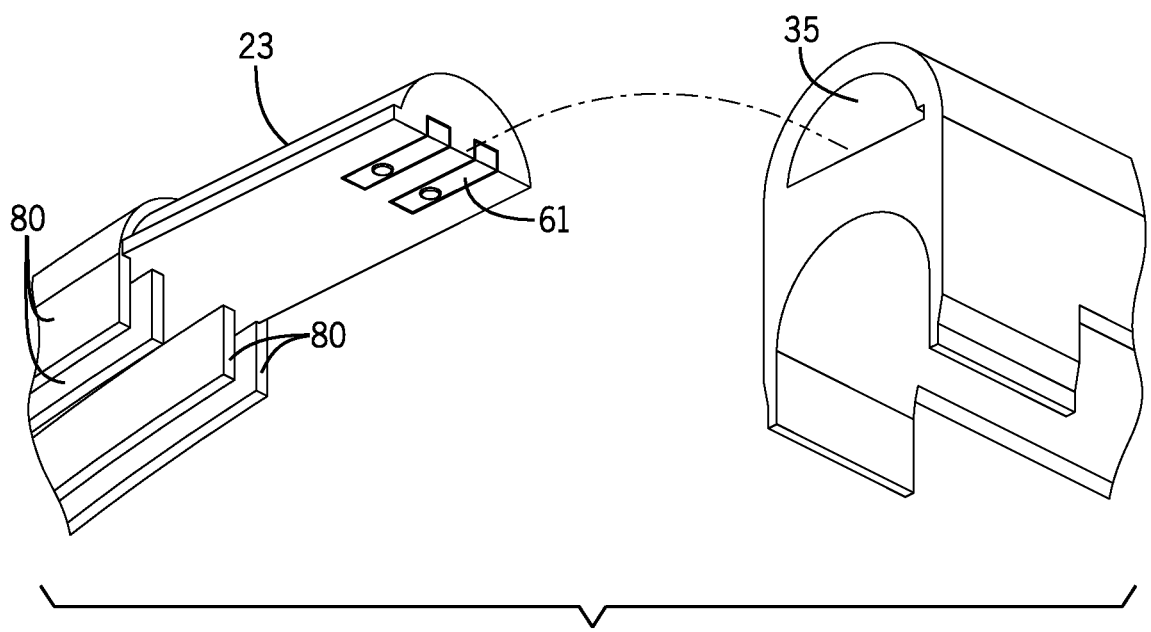
FIG. 6 illustrates a view of the underside of the connector unit and the single individual frame member unit of FIG. 5.
Figure 7:
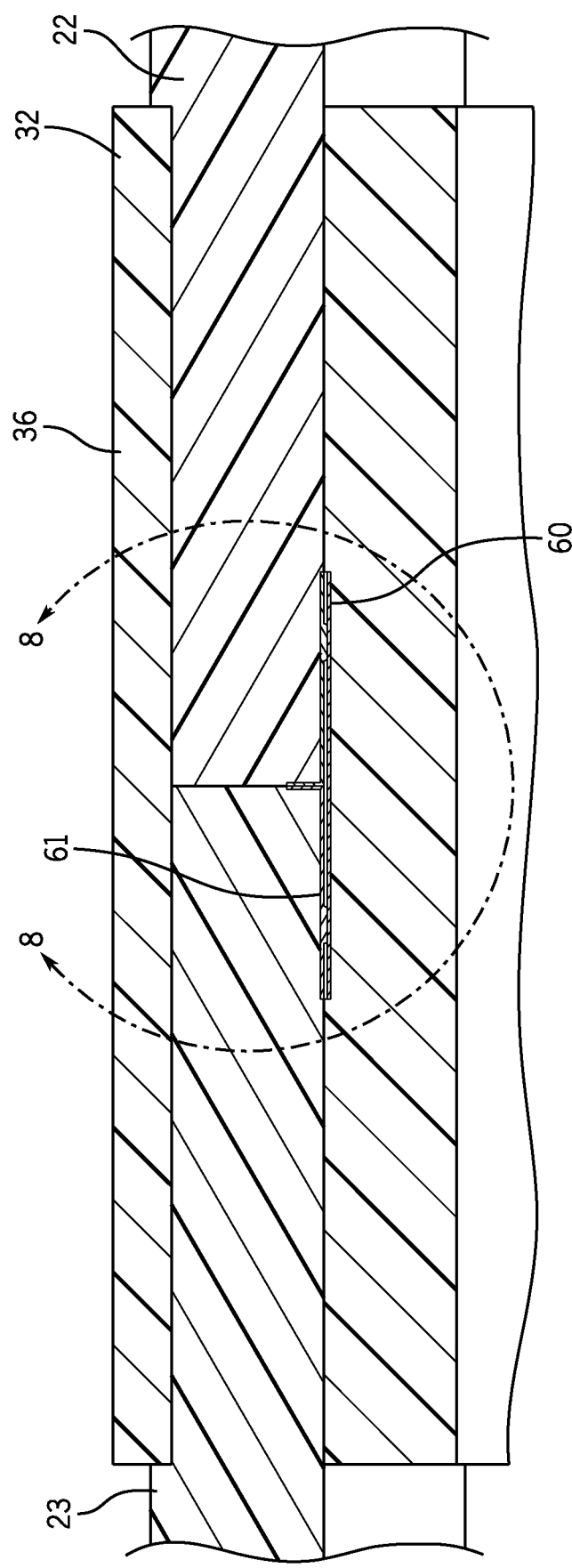
FIG. 7 illustrates a cross-sectional view of two individual frame member units of the present illuminated rim inserted into the connector unit of the illuminated rim.

In an embodiment, the underside of each of the individual frame units 21 may have at least one extended rim 80 (or "elevated rim") (FIG. 6). The figures generally illustrate four extended rims 80 located on the underside of each of the individual frame members 21; however, a greater or fewer number of extended rims 80 may be used. The extended rims 80 of the present device may allow the illuminated rim 20 to be properly elevated above the existing rim of the roundnet set so that present device 1 is stable and secure during play.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. An illuminated rim for a roundnet set comprising:
    a frame unit having a top, a bottom and an interior;
    a connector unit of the frame unit wherein the connector unit has a top, a bottom and an interior;
    a securing mechanism located on the bottom of the connector unit wherein the securing mechanism secures the frame unit to a top of roundnet set;
    a light incorporated into the frame unit;
    at least two extended rims having a bottom on the bottom of the frame unit wherein the bottoms of the extended rims contacts the top of the roundnet set and elevates the frame unit above the roundnet set.

2. The illuminated rim for a roundnet set of claim 1 further comprising:
    a plurality of connector units and a plurality of individual frame units wherein the plurality of connector units and the plurality of individual frame units together when assembled form the illuminated rim.

3. The illuminated rim for a roundnet set of claim 2 further comprising:
    a first end of each individual frame unit and a second end of each individual frame unit; and
    an electrically conductive strip located on the first end of the individual frame unit and an electrically conductive strip located on the second end of the individual frame unit.

4. The illuminated rim for a roundnet set of claim 2 further comprising:
    a first end of each of the connector units and a second end of each of the connector units; and
    an opening at the first end of each of the connector units and an opening at the second end of each of the connector units and an interior channel extending from the opening of the first end of the connector unit to the opening of the second end of the connector units.

5. The illuminated rim for a roundnet set of claim 4 further comprising:
    an electrical strip located within the interior channel of the connector units wherein the electrical strip of the interior channel of the connector unit forms an electrical connection between two electrical strips of individual frame units when the electrical strips of the two individual frame units contact the electrical strip of the interior channel of the connector unit.

6. The illuminated rim for a roundnet set of claim 4 wherein the opening of the first side of the connector unit has a first side and a second side and wherein the opening of the second side of the connector unit has a first side and a second side;
    an extended opening forming an elongated curved channel located on the first side of the opening of the first side of the connector unit and extending to the first side of the opening of the second side of the connector unit wherein the elongated curved channel of the connector unit receives an extended ridge of the individual frame units and therein prevents the individual frame units from improperly being inserted into the connector unit.

7. The illuminated rim for a roundnet set of claim 2 wherein the connector units and the individual frame units are curved so as to form a circle when assembled.

8. The illuminated rim for a roundnet set of claim 2 further comprising:
    at least one extended rim located on a bottom of the individual frame units wherein the extended rim provides support for the illuminated rim while the illuminated rim is secured to the roundnet frame.

9. The illuminated rim for a roundnet set of claim 1 wherein the light is incorporated within the interior of the frame unit.

10. The illuminated rim for a roundnet set of claim 9 wherein the frame unit is at least partially transparent.

11. The illuminated rim for a roundnet set of claim 1 wherein the light changes colors.

12. The illuminated rim for a roundnet set of claim 1 further comprising:
    a power source located in the frame unit for providing power to the light.

13. The illuminated rim for a roundnet set of claim 1 wherein the illuminated rim has a diameter which is identical to a diameter of a roundnet set.

14. An illuminated rim for a roundnet set comprising:
    a frame unit having a top, a bottom and an interior;
    a connector unit of the frame unit wherein the connector unit has a top, a bottom and an interior;
    a securing mechanism located on the bottom of the connector unit wherein the securing mechanism secures the frame unit to a roundnet set;
    a light incorporated into the frame unit;
    a plurality of connector units and a plurality of individual frame units wherein the plurality of connector units and the plurality of individual frame units together when assembled form the illuminated rim;
    a first end of each individual frame unit and a second end of each individual frame unit; and
    an electrically conductive strip located on the first end of the individual frame unit and an electrically conductive strip located on the second end of the individual frame unit.

15. An illuminated rim for a roundnet set comprising:
    a frame unit having a top, a bottom and an interior;
    a connector unit of the frame unit wherein the connector unit has a top, a bottom and an interior;
    a securing mechanism located on the bottom of the connector unit wherein the securing mechanism secures the frame unit to a roundnet set;
    a light incorporated into the frame unit;
    a plurality of connector units and a plurality of individual frame units wherein the plurality of connector units and the plurality of individual frame units together when assembled form the illuminated rim;
    a first end of each of the connector units and a second end of each of the connector units;
    an opening at the first end of each of the connector units and an opening at the second end of each of the connector units and an interior channel extending from the opening of the first end of the connector unit to the opening of the second end of the connector units; and
    an electrical strip located within the interior channel of the connector units wherein the electrical strip of the interior channel of the connector unit forms an electrical connection between two electrical strips of individual frame units when the electrical strips of the two individual frame units contact the electrical strip of the interior channel of the connector unit.

16. An illuminated rim for a roundnet set comprising:
a frame unit having a top, a bottom and an interior;
a connector unit of the frame unit wherein the connector unit has a top, a bottom and an interior;
a securing mechanism located on the bottom of the connector unit wherein the securing mechanism secures the frame unit to a roundnet set;
a light incorporated into the frame unit;
a plurality of connector units and a plurality of individual frame units wherein the plurality of connector units and the plurality of individual frame units together when assembled form the illuminated rim;
a first end of each of the connector units and a second end of each of the connector units; and
an opening at the first end of each of the connector units and an opening at the second end of each of the connector units and an interior channel extending from the opening of the first end of the connector unit to the opening of the second end of the connector units;
wherein the opening of the first side of the connector unit has a first side and a second side and wherein the opening of the second side of the connector unit has a first side and a second side; and
an extended opening forming an elongated curved channel located on the first side of the opening of the first side of the connector unit and extending to the first side of the opening of the second side of the connector unit wherein the elongated curved channel of the connector unit receives an extended ridge of the individual frame units and therein prevents the individual frame units from improperly being inserted into the connector unit.

17. An illuminated rim for a roundnet set comprising:
a frame unit having a top, a bottom and an interior;
a connector unit of the frame unit wherein the connector unit has a top, a bottom and an interior;
a securing mechanism located on the bottom of the connector unit wherein the securing mechanism secures the frame unit to a roundnet set;
a light incorporated into the frame unit;
a plurality of connector units and a plurality of individual frame units wherein the plurality of connector units and the plurality of individual frame units together when assembled form the illuminated rim; and
at least one extended rim located on a bottom of the individual frame units wherein the extended rim provides support for the illuminated rim while the illuminated rim is secured to the roundnet frame.

* * * * *